United States Patent
Toda et al.

(10) Patent No.: US 7,033,050 B2
(45) Date of Patent: Apr. 25, 2006

(54) PROJECTING DIRECTION CONTROL SYSTEM FOR VEHICLE HEADLAMP

(75) Inventors: Atsushi Toda, Shizuoka (JP); Atsushi Yamazaki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 158 days.

(21) Appl. No.: 10/694,300

(22) Filed: Oct. 27, 2003

(65) Prior Publication Data

US 2004/0105272 A1 Jun. 3, 2004

(30) Foreign Application Priority Data

Nov. 19, 2002 (JP) ............ P. 2002-334741

(51) Int. Cl.
*B60Q 1/10* (2006.01)

(52) U.S. Cl. .................. 362/466; 362/464; 701/49

(58) Field of Classification Search ........ 362/464–468; 701/49
See application file for complete search history.

(56) References Cited

U.S. PATENT DOCUMENTS

| | | | | |
|---|---|---|---|---|
| 4,204,270 A | * | 5/1980 | Poirier d'Ange d'Orsay .... | 362/466 |
| 5,787,370 A | * | 7/1998 | Kutscher et al. ............ | 362/465 |
| 6,193,398 B1 | * | 2/2001 | Okuchi et al. .............. | 362/466 |
| 6,389,344 B1 | * | 5/2002 | Nishimura et al. ......... | 362/466 |
| 6,430,521 B1 | * | 8/2002 | Toda ........................ | 702/150 |
| 6,450,673 B1 | * | 9/2002 | Toda et al. ................. | 362/465 |
| 6,821,005 B1 | * | 11/2004 | Uchida et al. .............. | 362/466 |
| 2003/0090960 A1 | * | 5/2003 | Kayano et al. ............. | 362/465 |

FOREIGN PATENT DOCUMENTS

| | | |
|---|---|---|
| JP | 10-226271 | 8/1998 |
| JP | 10-230777 | 9/1998 |
| JP | 2001-080409 | 3/2001 |

* cited by examiner

*Primary Examiner*—Alan Cariaso
(74) *Attorney, Agent, or Firm*—Fish & Richardson P.C.

(57) ABSTRACT

A projecting direction control system for a vehicle lighting device is provided with height detecting means for detecting variation in the height of a front-wheel or a rear-wheel axle portion, auxiliary detection means for accurately controlling the direction of an optical axis of projection light for a vehicle headlamp in response to vehicle load variation, and light projection control means for controlling the optical axis of light in response to variation in the vehicle posture according to the information obtained by the height detecting means and the auxiliary detection means. When the auxiliary detection means such as a seat sensor becomes in abnormal condition, the direction of the optical axis of light is controlled so as to be tilted downward from the direction of the optical axis of projection light with the auxiliary detection means remaining in a normal condition.

8 Claims, 2 Drawing Sheets

PROJECTING DIRECTION CONTROL SYSTEM FOR VEHICLE HEADLAMP

BACKGROUND OF THE INVENTION

The present invention relates to a projecting direction control system using an auxiliary detection means such as a seat sensor and a gyro sensor with an art of preventing a blinding glare directed onto oncoming vehicles by an inappropriate correction of an optical axis by a malfunctioning of the auxiliary detection means.

As an instrument for controlling the projecting direction of a vehicle headlamp such that the projecting direction thereof is corrected in response to variation in the vehicle posture, there is a known instrument for automatically adjusting the projecting direction of the headlamp (a so-called auto-leveling instrument) so that the projecting direction of the headlamp is held in a predetermined state even when the inclination of the vehicle changes. When applied to a headlamp system affording a large quantity of light with a discharge lamp as a light source, such an instrument is effective in improving safety as glare is prevented from being directed onto oncoming vehicles.

In an instrument of the sort mentioned above, as disclosed in JP-A-10-226271 (Japanese Application Publication Number: Hei10-226271), JP-A-10-230777 (Japanese Application Publication Number: Hei10-230777) and JP-A-2001-080409 (Japanese Application Publication Number: 2001-080409), for example, the height value of a front-wheel axle portion is presumed or estimated from the information obtained by one height-detecting means (height sensor) provided in the rear-wheel axle portion of a vehicle, and the pitch angle of the vehicle is then obtained so as to drive the reflecting mirror of a lighting device to negate the variation of the pitch angle whereby to perform correction control in order that the angle-to-ground of an optical axis of projection light is kept at a regular angle.

In a system of estimating the vehicle posture using the information obtained by one height-detecting means, as it is needed to suppress dazzling light causing glare on taking into consideration an entire load condition (e.g., a passenger loadfactor, a carrying condition, etc.). Therefore, an optical axis of light projected from a headlamp is often controlled so that the optical axis thereof is tilted slightly downward with respect to the horizontal plane in view of not bringing about glare even in a normal load condition (e.g., only a driver is on board), and this is unsatisfactory as viewed from the forward visibility of the driver.

In order to the solve the problem above, an arrangement using an auxiliary detection means for detecting the load condition as described below, for example, is conceivable.

A system utilizing auxiliary signals detected by a seat sensor, a seat-belt sensor and the like for detecting the presence or absence of a person seated in the passenger seat.

A system utilizing auxiliary signals detected by a gyro sensor, a G sensor and the like.

In any one type of system above, variations in the load condition and in the inclination of the vehicle are detected by the auxiliary detection means and control of the optical axis of projection light is performed in response to the variations.

In the conventional projecting direction control systems, however, control of the optical axis of light projected from the headlamp may not properly be performed in case that the auxiliary detection means is troubled from reasons such as a breaking down of a wire or an electrically non-connected condition by a dislocated connector. Consequently, it is feared that dazzling light toward oncoming vehicle drivers and road users becomes conspicuous.

While the seat sensor is functioning properly with a person seated in the passenger seat, for example, an additional load is applied to the front-wheel axle portion as compared with a case where only a driver is on board. Therefore, the projecting direction control system makes correcting calculation by detecting the sinking of the forepart of the vehicle from the height information obtained and controls the direction of the optical axis of projection light on the basis of the calculated result. However, in case the seat sensor is in an abnormal state or in a malfunctional state, the correction of the optical axis of projection light without matching the actual load condition is made in that a person is detected as seated in the passenger seat though no one is actually seated in the passenger seat. On the other hand, no one is conversely detected as seated in the passenger seat though a person is actually seated in the passenger seat, whereby there is the possibility that an unexpected control condition occurs and consequently brings about glare.

SUMMARY OF THE INVENTION

It is therefore a problem to be solved by the present invention, to prevent glare from being directed onto oncoming vehicles by nonconformity in a projecting direction control system, even if an auxiliary detection means is in trouble, for a vehicle headlamp with a seat sensor and the like used as the auxiliary detection means.

In accordance to the present invention, there is provided a projecting direction control system for a vehicle headlamp comprises height detecting means for detecting variation in the height of an axle portion of a front-wheel or a rear-wheel, auxiliary detection means for accurately controlling the direction of an optical axis of projection light for the vehicle headlamp in response to vehicle load variation, and light projection control means for controlling the optical axis of light projected from the vehicle headlamp in response to variation in the vehicle posture according to the information obtained by the height detecting means and the auxiliary detection means, wherein in case the auxiliary detection means is in an abnormal condition such as electrical trouble and an electrically non-connected condition, the direction of the optical axis of light projected from the vehicle headlamp is controlled so as to be tilted downward from the direction of the optical axis of projection light with the auxiliary detection means remaining in a normal condition.

Therefore, according to the present invention, the direction of the optical axis of light projected from the headlamp is tilted downward (the angle-to-ground of the optical axis of projection light becomes greater) with the auxiliary detection means in the abnormal condition other than the normal condition, so that dazzling light causing glare is suppressed from being brought about.

DESCRIPTION OF THE PREFERRED EMBODIMENT

The invention relates to a leveling instrument (so-called auto-leveling instrument) provided with a height detecting means for detecting variation in the height of a front- or a rear-wheel axle portion and used for performing projecting direction control that follows variation in the posture of a vehicle in a standing condition or a driving condition.

Figure 1:
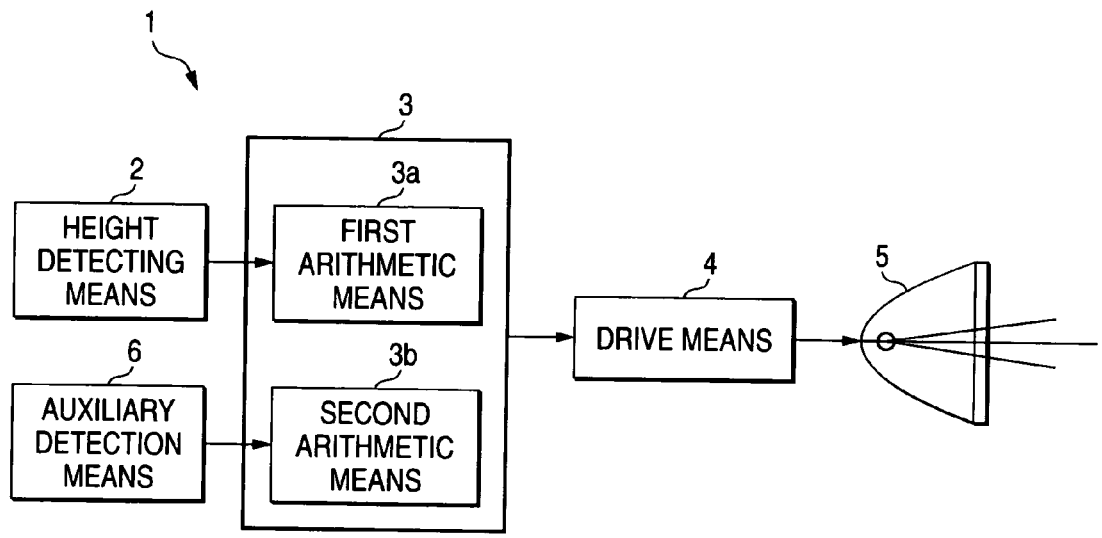
FIG. 1 is a block diagram showing a basic projecting direction control system configuration according to the present invention.

FIG. 1 is a block diagram showing a basic projecting direction control system configuration for a vehicle headlamp according to the invention.

A projecting direction control system 1 is provided with a height detecting means 2, a light projection control means 3 and a drive means 4 and used for controlling the direction of an optical axis of light projected from a headlamp 5. In the case of an automotive lighting device, for example, a headlamp, a fog lamp, a cornering lamp and so forth may be cited.

The height detecting means 2 is provided for detecting a vehicle posture (including an inclination within the vertical plane in the direction of travel) during the time the vehicle stands still and/or it is in motion and used for detecting variation in the height of the front- or rear-wheel axle portion. In an arrangement of FIG. 2, for example, the height detecting means (height sensor) 2 is provided in the rear wheel portion of the vehicle to detect height displacement involved with the rear-wheel axle portion.

The information obtained by the height detecting means 2 is sent to the light projection control means 3 and a pitch angle indicating the vertically tilted posture in the direction of travel of the vehicle is computed, so that a control amount for use in correcting the optical axis of projection light from the headlamp 5 is calculated. In this case, the light projection control means 3 uses a computing means such as a computer and the calculations for working out the pitch angle and for controlling the optical axis of projection light are processed with software.

Figure 2:
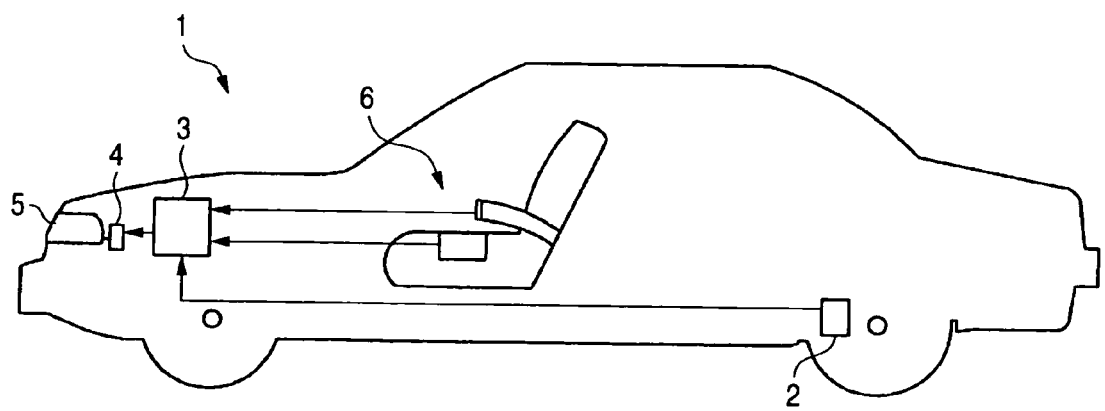
FIG. 2 is a schematic illustration with a height detecting means provided in the rear wheel portion of a vehicle according to the present invention.

In the arrangement of one height-detecting means 2 as shown in FIG. 2, as it is needed to estimate height information on one of the front and rear wheel portions from height information on the other wheel portion with predetermined control expressions, an auxiliary detection means 6 is employed for accurately controlling the direction of the optical axis of light projected from the headlamp 5 with respect to vehicle load variation.

For example, the auxiliary detection means 6 includes various sensors as indicated below.

(A) A sensor for detecting the seated condition of a passenger (a seat sensor) and a sensor attached to the buckle of a seat belt for detecting whether the seat belt is fastened or not.

(B) Sensors such as a gyro sensor, a G sensor, an inclination sensor, an angular acceleration sensor and so on for measuring an inclination of the vehicle due to the vertical motion thereof.

The sensors in (A) and (B) are installed for the purpose of detecting the load variation accompanied with variations in the boarding and carrying conditions of passengers. In the case of (A) in particular, the sensors are intended to detect whether a passenger is seated, or to make it detectable whether a person is seated in the passenger seat, for example. In the case of (B), moreover, an inclination of the vehicle (an inclination of the vehicle with the central axis of the vehicle in parallel to the ground as a reference) can be measured with the load variation due to boarding and loading. Incidentally, the information obtained by the auxiliary detection means 6 is sent to the light projection control means 3.

On receiving a signal from the light projection control means 3, the drive means 4 changes the direction of the optical axis of light projected from the headlamp 5 so as to tilt the whole lighting device or to drive optical components including a lens, a reflecting mirror, a shade and so forth. As an arrangement of performing the leveling control of the headlamp 5 by operating a mechanism for driving (or adjusting) the optical axis of projection light, using a motor and its drive circuit, for example, there is some known form of tilting a reflecting mirror on the vertical plane including the optical axis.

When the auxiliary detection means 6 becomes into abnormal state, that is, when a sensor constituting the auxiliary detection means malfunctions or an electrically non-connected (out of joint) condition occurs, for example, control is exerted to prevent the optical axis of projection light from turning in an unexpected direction so as to prevent glare from being brought about especially with the forepart of the vehicle body tilted upward according to the invention. Therefore, with the auxiliary detection means 6 in the abnormal condition, the direction of the optical axis of projection light is so controlled as to be tilted downward from the direction of the optical axis of projection light with the auxiliary detection means 6 remaining in the normal condition (whereby the angle-to-ground of the optical axis of projection light with the auxiliary detection means 6 remaining in the abnormal condition becomes greater than the angle-to-ground of the optical axis of projection light while the auxiliary detection means 6 is functioning properly).

With respect to the function of the light projection control means 3, a first arithmetic means 3a and a second arithmetic means 3b that are involved with the projecting direction control are separately formed as shown in the block diagram of FIG. 1.

The first arithmetic means 3a is used for computing the tilted posture of the vehicle according to the information from the height detecting means 2. The arithmetic means 3a estimates the vehicle pitch angle from the height information and calculates the control amount for use in correcting the optical axis of projection light. In otherwords, the arithmetic means 3a calculates the control amount for use in adjusting the direction of the optical axis of light projected from the headlamp 5 slightly downward when the forepart of the vehicle body is turned upward and conversely calculates the control amount for use in adjusting the direction of the optical axis of light projected from the headlamp 5 slightly upward when the forepart of the vehicle body is turned downward (the arithmetic means 3a having a role of calculating the basic control amount for offsetting the change of the optical axis of projection light caused by variation in the pitch angle).

On the contrary, the second arithmetic means 3b computes the tilted posture of the vehicle according to the information from the auxiliary detection means 6 and functions with the auxiliary detection means 6 remaining in the normal condition but does not function when the auxiliary detection means 6 develops abnormality.

Of both the arithmetic means 3a and 3b, the arithmetic means 3a carrying out arithmetic operations for computing the vehicle posture according to the information on the vehicle height is placed in charge of the basic control. Further, the arithmetic means $3a$ computes the vehicle posture by means of control expressions in consideration of the load condition including the maximum load of the vehicle and the number of passengers, wherein the optical axis of projection light is set to tilt downward in order to prevent glare from being brought about in the normal load condition (less than the maximum load or less than the maximum number of passengers).

The arithmetic means $3b$ is provided for properly correcting the optical axis of projection light with respect to the change of the load condition by reference to the information from the auxiliary detection means 6.

In the structure of employing the seat sensor as the auxiliary detection means 6 for the passenger seat, a boarding condition with only one driver can be distinguished from another boarding condition with a driver and a passenger seated in the passenger seat. While the auxiliary detection means 6 is functioning properly with the passenger detected in the passenger seat, the result of calculation concerning the vehicle posture in the second arithmetic means $3b$ is smaller than the result of calculation concerning the vehicle posture in the first arithmetic means $3a$, whereupon the correction of the optical axis of projection light reflecting the result of calculation made by the second arithmetic means $3b$ is carried out in this case. Consequently, the direction of the optical axis of projection light is turned relatively upward (where the angle-to-ground of the optical axis of projection light is small) in the boarding condition with the passenger seated in the passenger seat as compared with the boarding condition with only one passenger. In other words, the calculations based on different control expressions are required for the case of carrying the passenger seated in the passenger seat and for the case of solely carrying one driver and variation in the vehicle posture is smaller in the former than that in the latter (as the variation in the vehicle posture with respect to the variation in the vehicle height remains small).

With the auxiliary detection means 6 remaining in the normal condition, the correction of the optical axis of projection light can properly be made even in the system using the one height detecting means by positively utilizing the information thus obtained. There is also a known system for switching the control expressions so as to compute the pitch angle with respect to the variation in the height by reference to the information obtained by the auxiliary detection means 6.

While the auxiliary detection means 6 is functioning properly, it is permitted to not only compute the control amount for use in correcting the optical axis of projection light on the basis of the results calculated by both the arithmetic means $3a$ and $3b$ but also control the projecting direction by the drive means 4.

When the auxiliary detection means 6 develops abnormality such as malfunction, the correction of the optical axis of projection light on the basis of the result calculated by the second arithmetic means $3b$ is prohibited. As the correction of the optical axis of projection light on the basis of only the result calculated by the first arithmetic means $3a$ is thus made, the direction of the optical axis of projection light is so controlled as to be tilted relatively downward as compared with the auxiliary detection means 6 remaining in the normal condition. Although the direction of the optical axis of projection light is so regulated as to be tilted downward as seen from the front, irrespective of the presence or absence of the passenger seated in the passenger seat, for example, this results from the fact that the information obtained by the seat sensor is no longer reflected on the control amount involved with the optical axis of projection light.

The following arrangements are cited for deciding whether the auxiliary detection means 6 develops abnormality.

Figure 3:
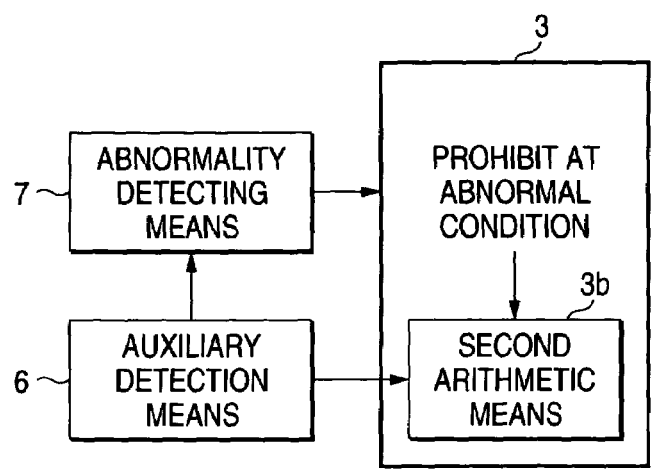
FIG. 3 is a block diagram illustrating a means for detecting the abnormality of an auxiliary detection means according to the present invention.

(A) Providing a means for detecting the abnormality of the auxiliary detection means (see FIG. 3).
(B) Providing a plurality of auxiliary detection means (see FIG. 4).

In the case of (A), a means for detecting abnormality (a means for detecting breaking of wire and shorting) is positively provided for the auxiliary detection means and as shown in FIG. 3, for example, a detection signal for indicating whether the auxiliary detection means 6 develops trouble is sent by an abnormality detecting means 7 to the light projection control means 3. When the abnormality of the auxiliary detection means 6 is detected, the correction of the optical axis of projection light on the basis of the result calculated by the second arithmetic means $3b$ is prohibited. Consequently, the direction of the optical axis of light projected from the vehicle headlamp is modified so that the direction thereof is tilted downward from the direction of the optical axis of projection light with the auxiliary detection means 6 remaining in the normal condition.

However, it should be taken into consideration that there is no guarantee that the abnormality detecting means 7 does not always output right detected results. When the abnormality detecting means 7 develops trouble, for example, safety measures are needed to cause only a detected signal for indicating the abnormality of the auxiliary detection means 6 to be emitted.

In the case of (B), moreover, the plurality of auxiliary detection means of the same kind are provided, for example, whereby when the results detected by the whole auxiliary detection means conform to one another, the normal condition is decided to exist, whereas when the results detected thereby are in discord with one another, abnormality is decided to exist. When the results detected by the detection means do not conform to one another, this means one of the auxiliary detection means develops trouble. In other words, when the inconsistency of information gain by the auxiliary detection means is detected, the correction of the optical axis of projection light on the basis of the result calculated by the second arithmetic means $3b$ is prohibited, whereby the direction of optical axis of projection light from the vehicle headlamp may be so controlled as to be tilted downward from the direction of the optical axis of projection light with the auxiliary detection means remaining in the normal condition.

When the signal obtained by each auxiliary detection means is made a binary signal, an abnormality detecting signal can readily be obtained as a result of a predetermined logical operation (such as AND and EXCLUSIVE-OR) based on that signal and any circuit for diagnosing the malfunction and abnormality of each auxiliary detection means is unnecessary.

Figure 4:
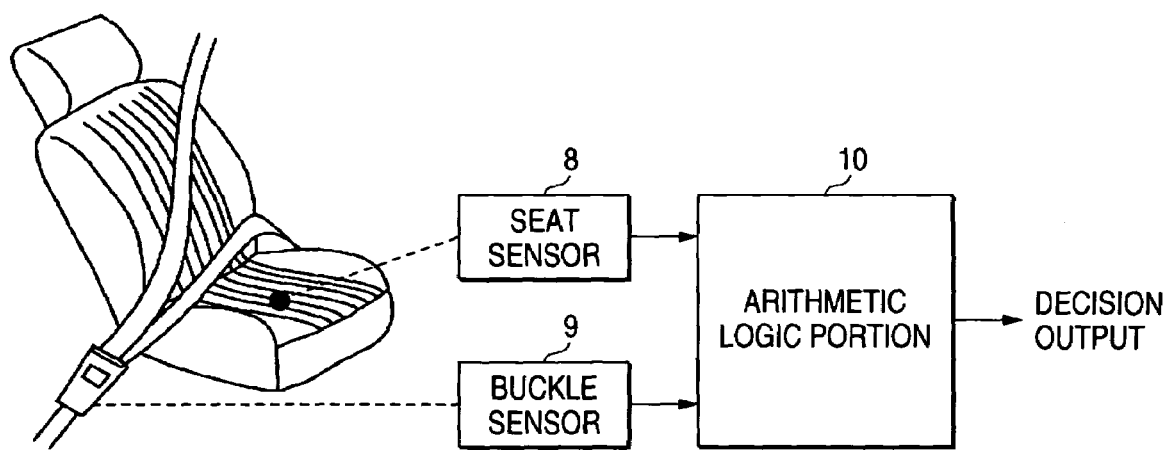
FIG. 4 is a block diagram illustrating an arrangement of a seat sensor and a buckle sensor used together according to the present invention.

With an arrangement using the seat sensor 8 and the buckle sensor 9 of the seat belt as auxiliary detection means as shown in FIG. 4, for example, whether or not a person is seated in the passenger seat can be detected by these sensors.

When a person is seated in the seat on condition that fastening the seat belt is never forgotten and when the seat sensor 8 and the buckle sensor 9 are functioning properly, the information obtained by the respective sensors is sent to an arithmetic logic portion 10, whereby a value (logical value) indicating the presence of a passenger is obtained.

Thus control of correction of the optical axis of projection light is performed according to predetermined control expressions in harmony with the number and disposition of passengers.

In the system of correcting the control amount involved with the optical axis of projection light by detecting the presence or absence of a person seated in the passenger seat, for example, by utilizing the fact that 'as for front-wheel height at the time of applying the dead load accompanied with variations in the boarding and loading condition, a sinking amount in a no-load condition because of a vacant passenger seat is smaller than that with the passenger seat occupied,' control is performed such that the angle-to-ground of the optical axis of projection light by decreasing the control amount involved with the optical axis of projection light so as to relatively raise the optical axis of projection light when it is detected that the passenger seat is occupied (i.e., this is based on the result calculated by the second arithmetic means 3b).

When the seat sensor 8 or the buckle sensor 9 develops abnormality, there arises a difference between the results detected from the information obtained by the sensors. In other words, the presence of a passenger is suggested by the information on one side, whereas the absence of such a passenger is suggested by the information on the other. Therefore, the arithmetic logic portion 10 outputs a signal indicating that one of both the sensors has developed abnormality in case there is inconsistency therebetween. Accordingly, control of the optical axis of projection light expected to be performed with the vacant passenger seat detected is performed (on the basis of the result calculated by the first arithmetic means 3a). When both the sensors develop abnormality, no abnormality is inferred in case where both contents of error information are consistent with each other but the probability that the two sensors simultaneously develop trouble is low.

Thus it is desirable to prevent the optical axis of projection light of the lighting device from facing in an undesirable direction when one of the sensors malfunctions and particularly to control the optical axis of projection light so as to be tilted slightly downward lest the light that is directed upward and causes glare to be easily brought about is generated; this is also the case with not only the use of the seat sensor and the buckle sensor but also the occurrence of abnormality in each sensor in the structure of employing the plurality of sensors as auxiliary detection means capable of measuring inclination resulting from the vertical motion of the vehicle body.

The use of the auxiliary detection means for accurately controlling the optical axis of projection light in response to variation in the load distribution is especially effective in the form (so-called one sensor system) of estimating the height of the front- or rear-wheel axle portion by means of a predetermined control line by attaching one height detecting means to the front- or rear-wheel axle portion so as to detect variation in the height of the axle. However, the invention is not limited to the arrangement above but may needless to say be applicable to a form of attaching the height detecting means to both the front- and rear-wheel axle portions (so-called two sensor system). (In case where one of the height detecting means develops malfunction, for example, switching to the one sensor system imparts a significance to providing the plurality of auxiliary detection means).

As is obvious from the description given above, according to the present invention, glare is prevented from being directed to drivers of oncoming vehicles and road users, even if the auxiliary detection means becomes into trouble and nonconformity.

Furthermore, when the auxiliary detection means becomes into abnormality, it can be so arranged as to have the result calculated by the second arithmetic means unreflected on the correction of the optical axis of light projected from the vehicle headlamp, so that control of the direction of the optical axis of projection light is not performed with the abnormal condition unheeded.

Furthermore, a diagnostic circuit for detecting the abnormality of the auxiliary detection means can be dispensed with and detection reliability can also be enhanced.

Furthermore, variation in the load distribution involved with the passenger boarding condition and the load condition is detectable, therefore improper correction of the optical axis of projection light is prevented from being made when the sensor is in abnormal condition.

What is claimed is:

1. A projecting direction control system for a vehicle headlamp comprising:
   a height detecting means for detecting variation in the height of an axle portion of front-wheel or a rear-wheel;
   an auxiliary detection means for controlling the direction of light projected from the vehicle headlamp in response to vehicle load variation, and
   a light projection control means for controlling the optical axis of light projected from the vehicle headlamp in response to variation in the vehicle posture according to the information obtained by the height detecting means and the auxiliary detection means,
   wherein, in case the auxiliary detection means is in an abnormal condition, the direction of the optical axis of light projected from the vehicle headlamp is controlled so as to be tilted downward as compared to the direction of the optical axis of light with the auxiliary detection means remaining in a normal condition.

2. A projecting direction control system for a vehicle headlamp according to claim 1 further comprising:
   a first arithmetic means for computing the tilted posture of the vehicle according to the information obtained by the height detecting means, and
   a second arithmetic means for computing the tilted posture of the vehicle according to the information obtained by the auxiliary detection means,
   wherein a control amount for correcting the optical axis of light is computed on the basis of results calculated by both the arithmetic means,
   in case the auxiliary detection means is in an abnormal condition, the correction of the optical axis of light on the basis of the result calculated by the second arithmetic means is prohibited, and the optical axis of light is corrected on the basis of only the result calculated by the first arithmetic means.

3. A projecting direction control system for a vehicle headlamp according to claim 1,
   wherein a plurality of auxiliary detection means are installed in the system, and
   in case any one of the auxiliary detection means is in an abnormal condition, the direction of the optical axis of light projected from the vehicle headlamp is controlled so as to be tilted downward from the direction of the optical axis ofprojection light with the auxiliary detection means remaining in the normal condition.

4. A projecting direction control system for a vehicle headlamp according to claim 1, wherein the auxiliary detection means comprises a sensor for detecting the seated condition of a passenger or a sensor attached to the buckle of a seat belt for detecting whether the seat belt is fastened or not.

5. A projecting direction control system for a vehicle headlamp according to claim 1, wherein the auxiliary detection means comprises a sensor for measuring an inclination of the vehicle due to the vertical motion thereof.

6. A projecting direction control system for a vehicle headlamp according to claim 1, wherein the abnormal condition indicates a malfunction of the auxiliary detection means.

7. A projecting direction control system for a vehicle headlamp comprising:
 a height detecting means for detecting variation in the height of an axle portion of a front-wheel or a rear-wheel;
 an auxiliary detection means for controlling the direction of light projected from the vehicle headlamp in response to vehicle load variation; and
 a light projection control means for controlling the optical axis of light projected from the vehicle headlamp in response to variation in the vehicle posture according to the information obtained by the height detection means and the auxiliary detection means,
 wherein, when the auxiliary detection means is in an abnormal condition, control of the optical axis of light in the basis of the information obtained by the auxiliary detection means is prevented, and the optical axis of light is controlled on the basis only of information obtained by the height detecting means.

8. A projecting direction control system for a vehicle headlamp according to claim 7, wherein the abnormal condition indicates a malfunction of the auxiliary detection means.

* * * * *